United States Patent [19]

Srinivasan et al.

[11] Patent Number: 4,680,709
[45] Date of Patent: Jul. 14, 1987

[54] BACK PROJECTION IMAGE RECONSTRUCTION APPARATUS AND METHOD

[75] Inventors: Nallaswamy Srinivasan; Sharon L. Banaszewski, both of Waukesha; Kishore C. Acharya, West Ellis, all of Wis.

[73] Assignee: General Electric Company, Milwaukee, Wis.

[21] Appl. No.: 670,595

[22] Filed: Nov. 13, 1984

[51] Int. Cl.⁴ .................... G06F 15/42; G06G 7/60
[52] U.S. Cl. ..................... 364/414; 378/99; 358/111; 382/6
[58] Field of Search .............. 364/414; 378/401, 99; 358/111; 382/6

[56] References Cited

U.S. PATENT DOCUMENTS 4,135,247 1/1979 Gordon et al. ............... 364/414

Primary Examiner—Clifford C. Shaw
Assistant Examiner—Lincoln Donovan
Attorney, Agent, or Firm—Flehr, Hohbach, Test, Albritton & Herbert

[57] ABSTRACT

Image reconstruction time in a CT scanner is enhanced by using a pipeline structure and interpolation techniques to identify each detector for use in back projection of radiation aborption measurements through each pixel in each view of the scanner. In a preferred embodiment, detectors are identified by calculation for a pixel in every third view with detectors for intermediate views obtained by interpolation of the calculated detectors. Similarly, detectors are identified for every other pixel in a view with the detector for the intermediate pixel identified by interpolation.

10 Claims, 9 Drawing Figures

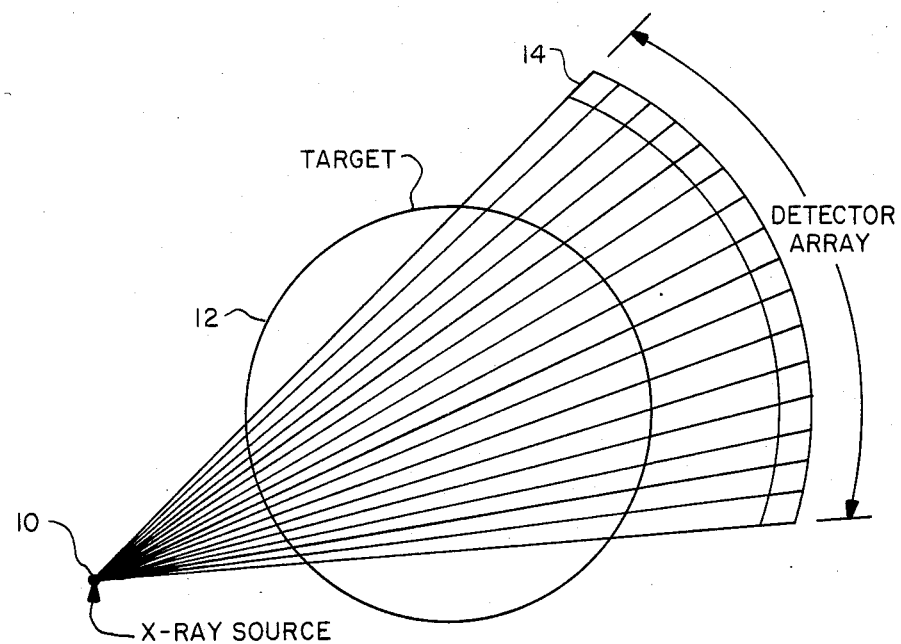
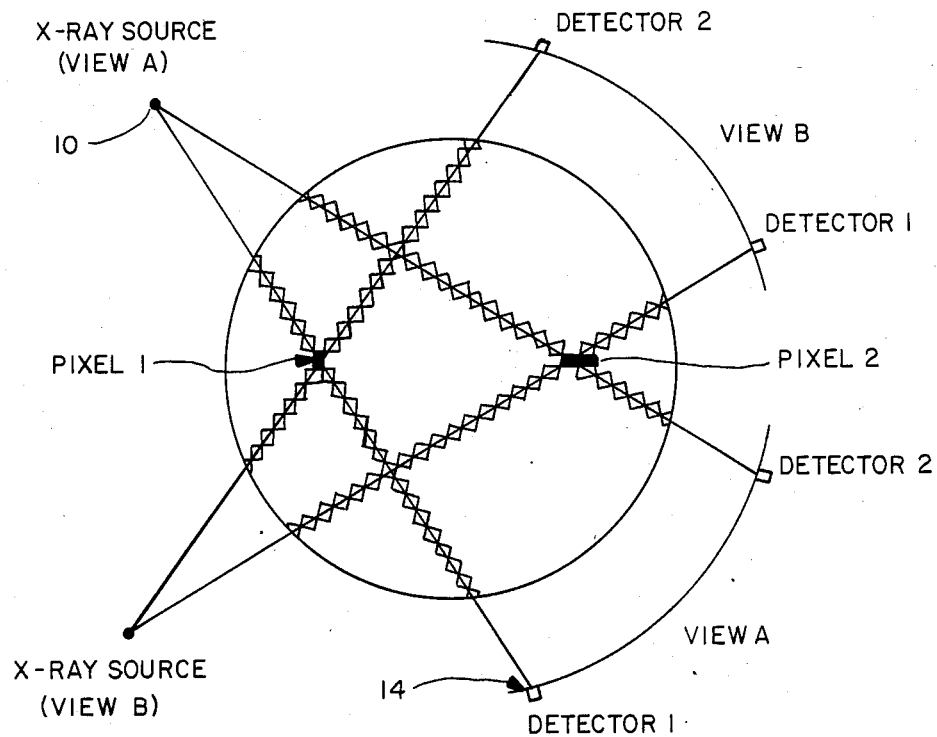

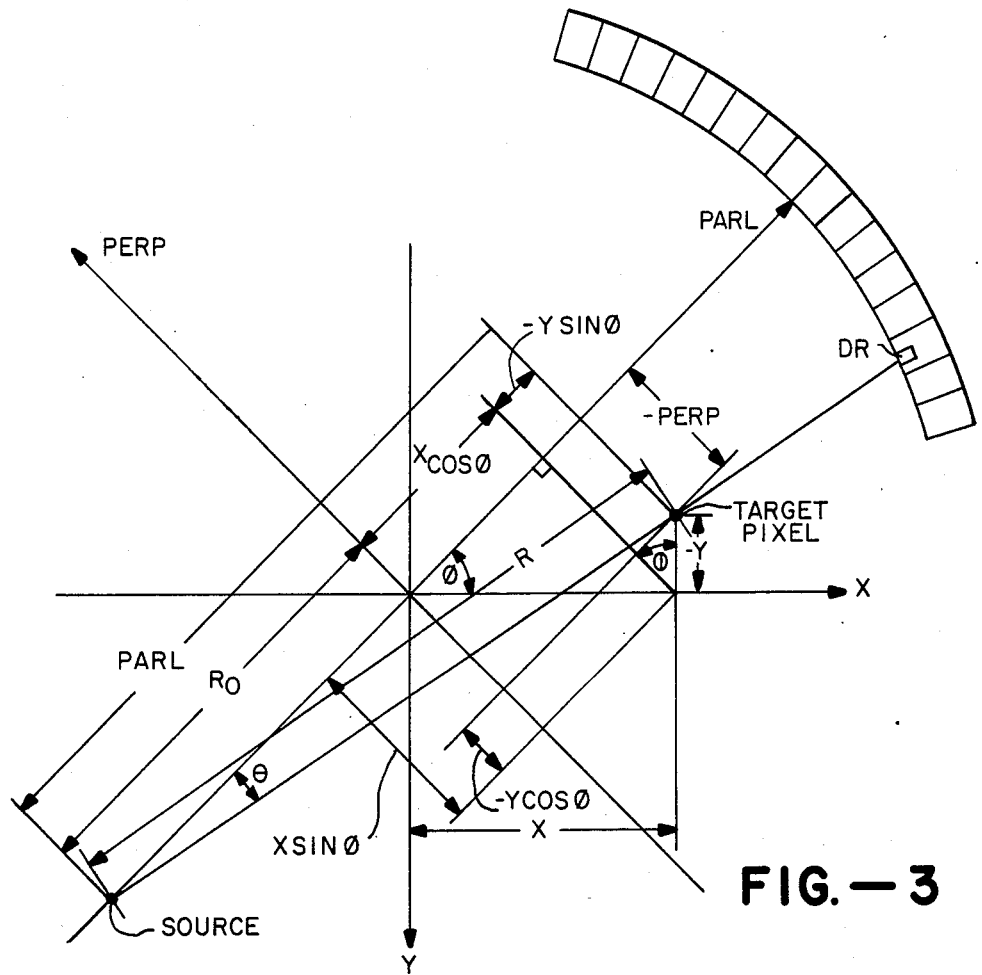
FIG.—3
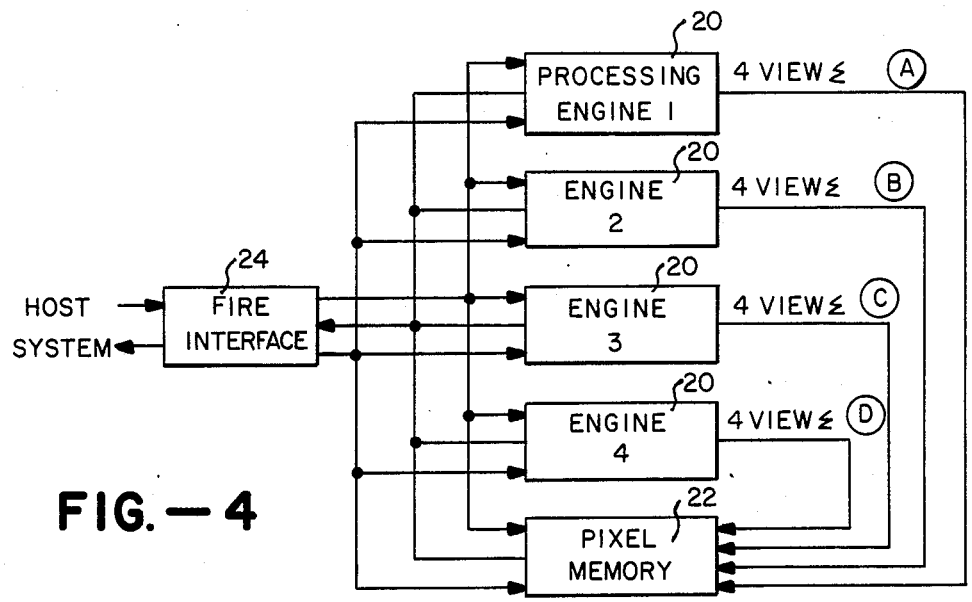
FIG.—4

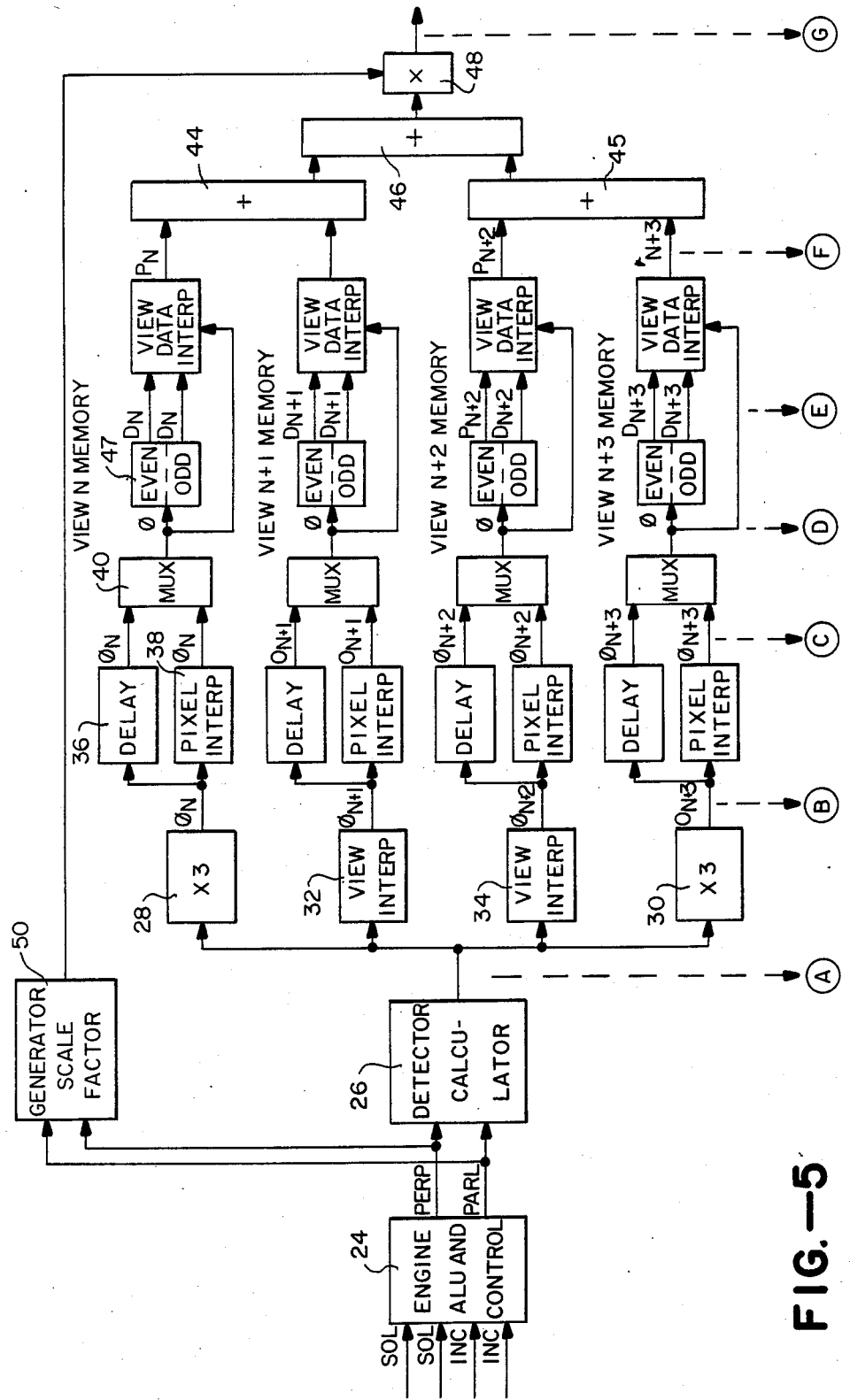
FIG.—5

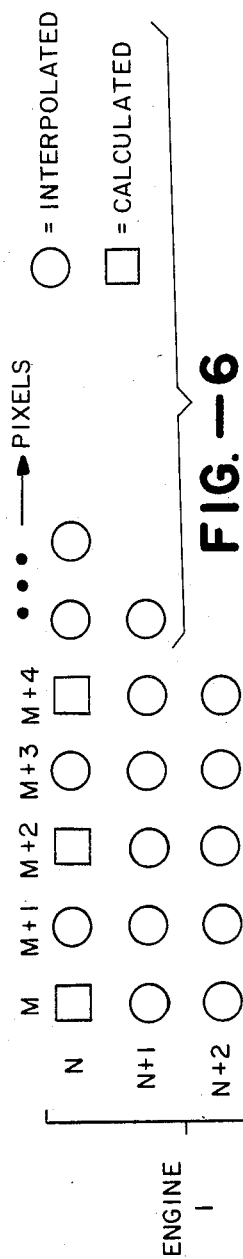
FIG.—6
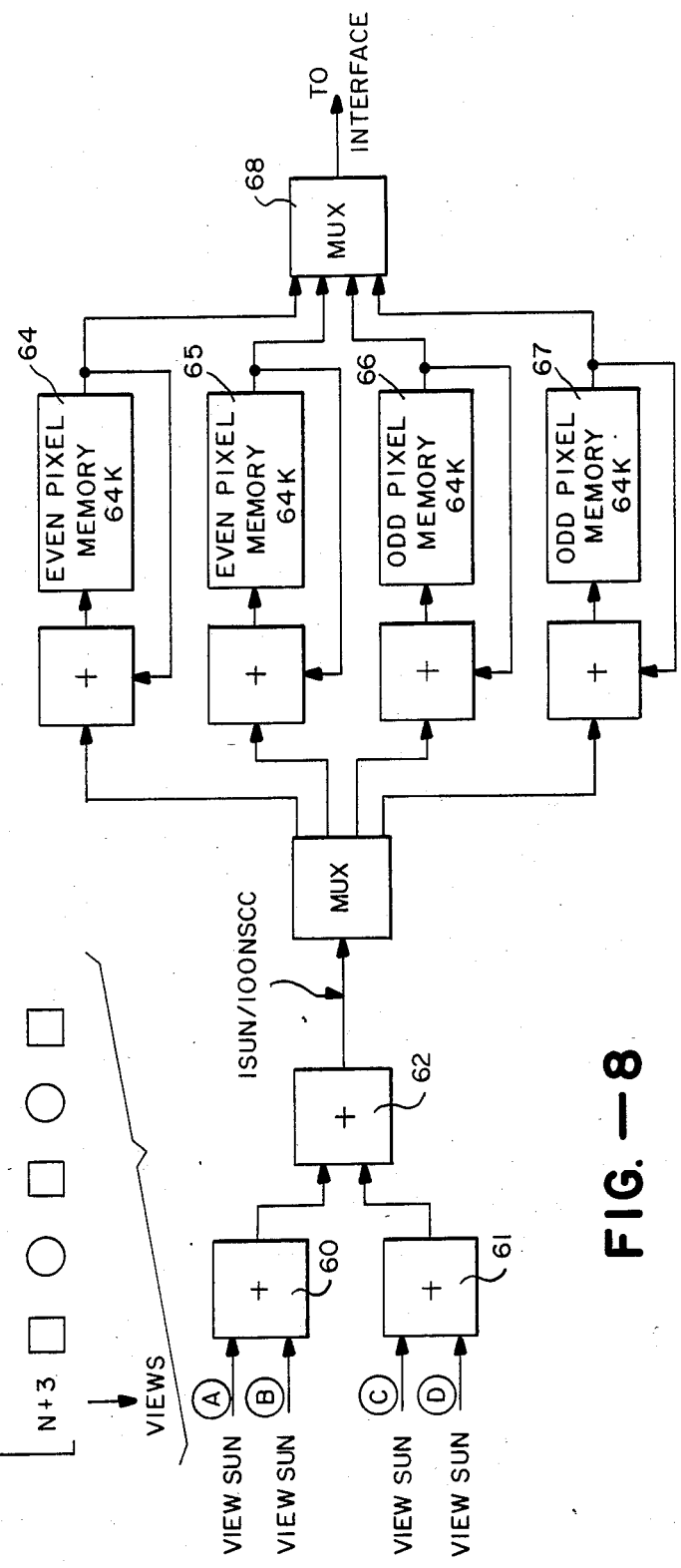
FIG.—8

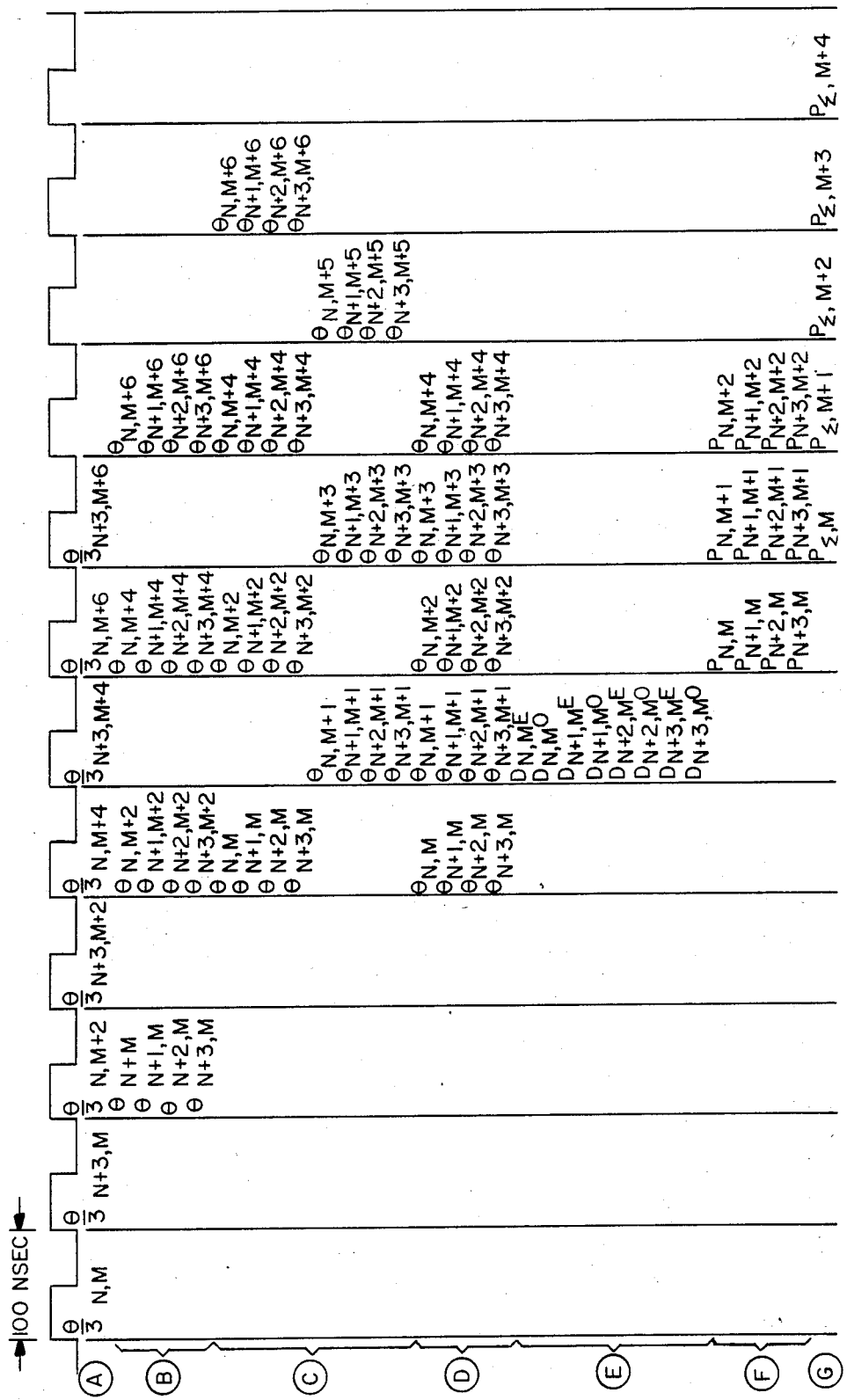
FIG.—7

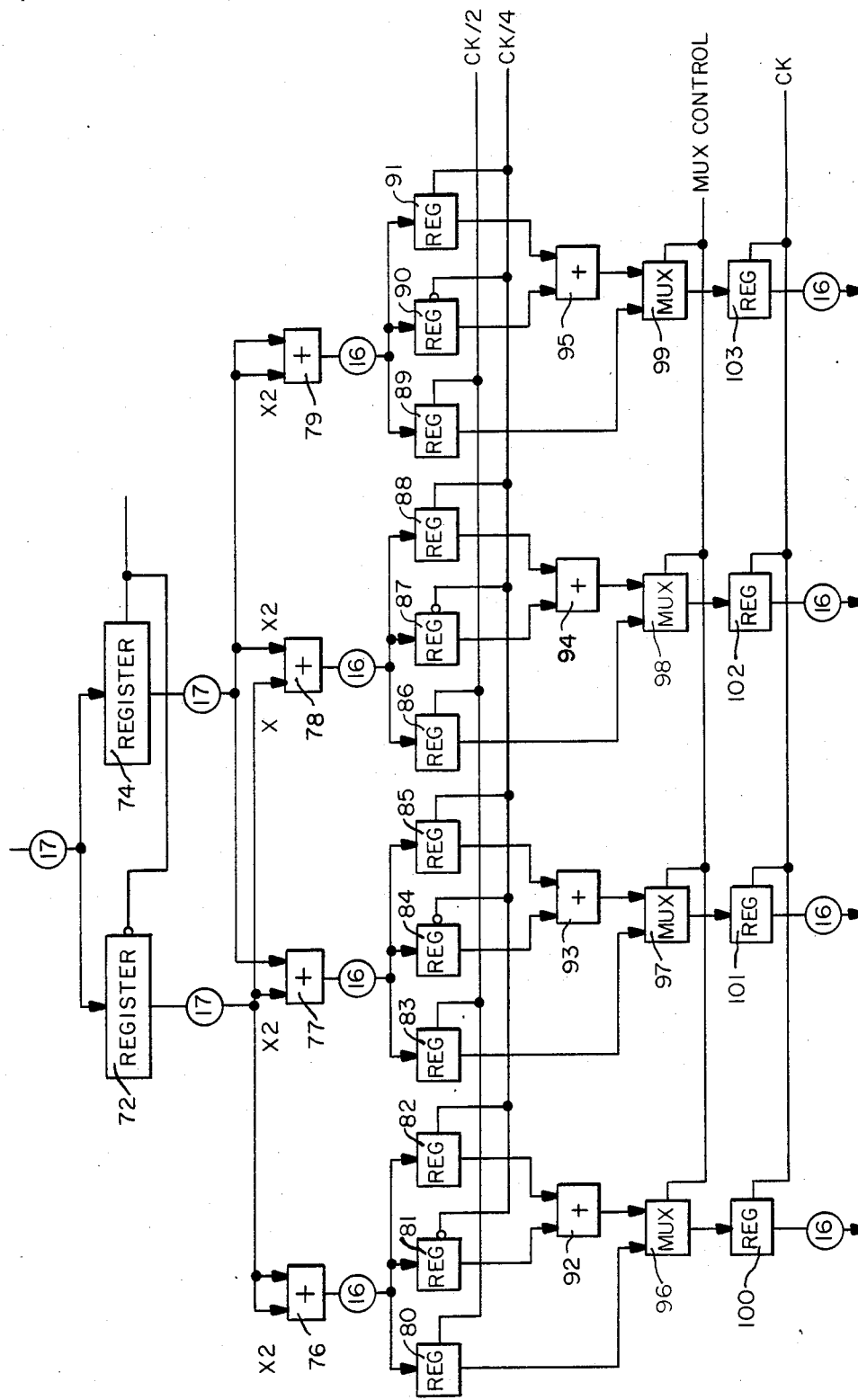
FIG.—9

BACK PROJECTION IMAGE RECONSTRUCTION APPARATUS AND METHOD

This invention relates generally to back projection image reconstruction such as used in computed tomography, and more particularly the invention relates to processing apparatus and a method for expeditiously converting detector attenuation data in polar coordinates into pixel data in Cartesian coordinates.

In computed tomography (CT) scanning systems, an X-ray fan beam is projected along a plane through a patient to a plurality of radiation detectors, which provide measurements of X-ray attenuation through the patient along radial lines defined by the X-ray source and the individual detectors. Measurements are made at a plurality of source positions or views around the patient to obtain sets of measurements representing sets of intersecting radiation beam paths. An image of the plane through the patient is obtaind by back projecting the X-ray measurements from each detector. The image plane is divided into small square cells (of width in the order of millimeters) called pixels. The back projection algorithm associates a detector number with each pixel in the field of view. The back projection formula also adjusts the detector measurements for each pixel as a function of the distance of the pixel from the source of radiation. These adjustment factors are called weight factors. The image is formed by summing the contribution of detector data for each pixel for all the views.

Current back projection hardware using Schottky circuit device technology as employed in the General Eelctric 9800 CT scanning systems requires 36 to 40 seconds to reconstruct a 512 by 512 pixel image of off-centered targets using 984 views or fan beam projections. This is an effective processing rate of 14–16 nanoseconds per pixel per view. Much of this processing time is devoted to the mapping of a detector number onto a pixel.

Accordingly, an object of the present invention is increased speed in the reconstruction of an image based on back projected radiation measurements.

Another object of the invention is an improved apparatus and method for mapping detector CT data into pixel data for reconstructing images.

A feature of the invention is the use of a pipelined circuit architecture for processing pixel data.

Another feature of the invention is the use of interpolation to obtain detector locations and weight factors for selected pixels.

Briefly, in accordance with the invention, circuitry is provided for mapping a detector onto each pixel in each view and obtaining pixel values for each view based on a weighted detector measurement. Since detector locations vary slowly between adjacent views and adjacent pixels, a pixel value for an intermediate view can be obtained by interpolating the values for the views on either side. Further, pixel values for every other pixel are calculated exactly. The intermediate pixel values are now obtained by interpolating between these exact values.

In a preferred embodiment the exact detector location is calculated for every third view for each pixel, and the exact detector location is calculated for every other pixel in any one view. Additionally, since the weight factor varies slowly with respect to adjacent pixels and views, a calculated weight factor is obtained only for selected views and pixels. Weight factors for intermediate views and pixels are obtained by interpolation.

The invention and objects and features thereof will be more readily apparent from the following detailed description and appended claims when taken with the drawing, in which:

FIG. 1 is a schematic illustrating the geometry of a CT system source and the detector array rotating about the center.

FIG. 2 is a schematic illustrating the back projection of detector data for reconstructing an image from multiple X-ray transmission measurements.

FIG. 3 is a schematic illustrating the coordinate system used in General Electric scanning systems including the pixel coordinate system and the detector coordinate system.

FIG. 4 is a functional block diagram of a reconstruction processing system in accordance with one embodiment of the system.

FIG. 5 is a more detailed functional block diagram of circuitry in the system of FIG. 4.

FIG. 6 and FIG. 7 illustrate timing in obtaining pixel values in a plurality of views in the circuitry of FIG. 5.

FIG. 8 is a functional block diagram of a pixel memory for the system of FIG. 4.

FIG. 9 is a schematic of an interpolation circuitry.

Referring now to the drawings, FIG. 1 is a schematic illustrating the geometry of a CT scanning system for an X-ray fan beam radiation. The X-ray source 10 is located on one side of a circular target area 12, and an array of detector elements 14 are positioned on the opposite side of the target area 12. As illustrated, the detectors of array 14 are equi-angularly spaced. A number of sets of radiation measurements or views are obtained by rotating the X-ray source and detector array around the target in equal increments. The process of converting the collected X-ray attenuation data from axial scans (i.e. view data) to viewable cross-sectional images involves a data reconstruction process. The three stages of reconstruction include filtering of the detector data, back projection of the detector data nd storage of the final pixel values for image display.

Back projection is a technique used to reconstruct an image from multiple X-ray transmission measurements. Referring to FIG. 2, the X-ray beam from source 10 passes through many small regions in the plane of the target area through which the views are taken before reaching the array of detectors 14. Each of the small regions through which the radiation passes are the picture elements or pixels which comprise the final displayed image. The X-ray absorption value for a pixel is calculated based on the location of the pixel with respect to the source and the corresponding detector value. The back projection algorithm performs calculations on a number of sets of view data to produce an image in which each pixel is a composite of all the views. In FIG. 2, the value of pixel 1 will include a weighted value of detector 1 in view A and a weighted value of detector 2 in view B. Similarly, the value of pixel 2 will include a weighted value of detector 2 in view A and a weighted value of detector 1 in view B. In order to back project a complete image, absorption data from all views of a given axial scan must be summed into each pixel. In the G.E. 9800 CT scanning systems, for example, an array of 512 by 512 pixels are defined from 730 detectors and 984 views.

The view coordinate system which defines a pixel's position with respect to the X-ray source and with respect to the detector array is an angular system with two coordinates. One coordinate is the angle theta between a line from the source to the center of the detector array and a line from the source through the pixel. The other coordinate is the distance R from the source to the pixel. The pixel coordinate system is rectilinear with its origin at the center of the target area which is also the center of rotation. Each pixel has a set of coordinates (X, Y) which defines its position with respect to the target center. FIG. 3 illustrates the two coordinate systems.

In the G. E. CT scanning system a third coordinate system called PERP and PARL is used to perform coordinate transformation. PARL is the distance from the source to a pixel parallel to the line connecting the source to the center of the detector array, and PERP is the perpendicular distance of the pixel from the line connecting the source and the center of the array. Once the PERP and PARL values of a pixel are known, the R and theta values for that pixel can be calculated. Using the R and theta, the detector number and the attenuation value for that pixel can be found. The relationship between (PERP, PARL) and (R,THETA) is:

THETA=ARCTAN (PERP/PARL)

$R^2$=PARL$^2$+PERP$^2$

PARL and PERP values for a pixel can be calculated from the geometry as follows:

PARL=$R_o$+X COS ($\phi$)− Y SIN($\phi$)

PERP=X SIN ($\phi$) − Y COS ($\phi$)

where $\phi$ is the angle between the x-axis of the (X, Y) coordinate system and 'x-ray source to center detector' vector. R0 is the distance between the x-ray source and the origin of the (X,Y) system. The angle $\phi$ varies for each view processed. This assumes that X and Y directions are as shown in the figure.

The detector number is given by the equation:

Detector No.=(L/DW)×theta where L is the source to detector distance and DW is the detector width.

The detector value is multiplied by a weighting factor which is applied to compensate for the fact that x-ray source intensity varies as the inverse square of distance from x-ray source. The weighting factor is given by the equation:

W=K/(PERP$^2$+PARL$^2$)

where K is a system constant (proportional to $R_o^2$).

As noted above conventional back projector hardware requires 36 to 40 seconds to reconstruct a 512×512 image based on 984 views. The present invention is directed to a method and apparatus for obtaining back projected image data more rapidly by employing interpolation processing and a pipelined architecture.

Referring now to FIG. 4 the system architecture of one embodiment of the invention is illustrated in which four reconstruction engines or circuits 20 are connected in parallel with each engine 20 obtaining values for pixels based on four consecutive views. By connecting the four engines in parallel the contributions of 16 consecutive views to a single pixel are averaged and stored in a pixel memory 22. The processing is continued until data from all 984 views is processed. Data for processing the pixel values including view angle, detector measurements, and initial PERP and PARL numbers for identifying a detector for each pixel in each view are obtained from the host system of the General Electric CT scanner through an interface 24. The averaged pixel values based on back projection using all views are transmitted from the pixel memory 22.

FIG. 5 is a more detailed functional block diagram of one of the reconstruction engines or circuits 20 of FIG. 4. The circuitry of FIG. 5 will be described in conjunction with the timing and operation diagrams in FIGS. 6 and 7. Data and control signals are received from the host system through the interface 24, and initial PERP and PARL data are supplied to a detector calculator 26 which calculates a detector for a particular pixel and view. The detector number for the Nth view and a specific pixel, M, is stored in register 28 and the detector number for the N+3 view for the M pixel is stored in register 30. The detector numbers for the n+1 and n+2 views are then linearly interpolated therefrom and stored at 32 and 34.

In accordance with this embodiment, detector numbers for every other pixel in the N and N+3 views are calculated and stored in the delay circuitry 36. The detector numbers for intermediate pixels for every other pixel in views N and N+3 are obtained through linear interpolation shown in 'VIEW INTERP' circuits 32 and 34. The detector numbers for intermediate pixels are obtained through linear interpolation horizontally using circuitry 38.

The detector numbers thus obtained are applied through a multiplexer 40 to address the detector data values stored in a double buffered memory 42. The detector values from the memory 42 and interpolations thereof are then employed to determine simultaneously the values of a pixel based on four consecutive views which are then summed by the adders 44, 45, and 46. The average value for each pixel based on four consecutive views is then applied to a multiplier 48 which multiples the pixel sum by a scale factor from the weight generator 50 based on the calculated and interpolated distances of the pixel from the radiation source. The final weighted value of each pixel based on the four views is then obtained at the output of the multiplier 48.

FIG. 6 illustrates the operation of the circuitry of FIG. 5 in generating detector numbers. A pixel (M) in four consecutive views (N, --- N+3) is illustrated in vertical columns, and consecutive pixels (M, --- M+4) in each view (N) are shown in each horizontal row. Calculated detector numbers for a pixel are illustrated by squares, and interpolated detector numbers for a pixel are illustrated by circles. The detector number is defined by the PERP and PARL numbers as follows:

$\theta_{N,M}$ α arctan (PERP/PARL)

where $\theta$ is the detector number for view N, pixel M. The view interpolation is given by:

$\theta_{M, N+1} = \theta_{M,N} + \frac{1}{3}(\theta_{M,N+3} - \theta_{M,N})$ $\theta_{M, N+2} = \theta_{M,N} + \frac{2}{3}(\theta_{M,N+3} - \theta_{M,N})$ The row or pixel interpolation is:

$\theta_{M+1,N} = \theta_{M,N} + \frac{1}{2}(\theta_{M+2,N} - \theta_{M,N})$

FIG. 7 identifies the detector numbers and pixel values obtained in the circuitry of FIG. 5 as a function of the timing clock. Thus, at a point A in the circuit of FIG. 5, detector numbers are calculated; at point B in the circuit the two interpolated detector numbers in each column are obtained; at point C the horizontal interpolation of detector numbers are calculated; at point D all detector numbers are available; at point E the detector values are obtained from memory, at point F pixel values are obtained based on the detector values; and a point G the summed and weighted pixel values for four views are obtained.

The identification of pixel values for all 984 views can be accomplished by cycling all views through a single engine as shown in FIG. 5. However, as shown in FIG. 4 four such engines can be operated in parallel whereby 16 views are processed concurrently. FIG. 8 is a functional block diagram of circuitry for receiving the summed pixel values based on four views from each of the back projection circuits which are then added and averaged by adders 60, 61, and 62. Consecutive pixel values are then multiplexed into memories 64, 65, 66, and 67 for storing the accumulated pixel values. The back projection circuitry is recycled until pixel values based on all 984 views are obtained, added and stored in the memories 64–67. Thus, the memories 64–67 in combination will store 28 bit pixel values for 512×512 pixels. The final pixel values are then applied through a multiplexer 68 to the host system.

FIG. 9 is a schematic of one embodiment of the detector number interpolation circuitry. The calculated detector numbers are provided at 70 from known circuitry in the General Electric 9800 CT scanners. Alternate calculated detector numbers are clocked into registers 72 and 74, and these detector numbers are then selectively doubled as noted and clocked into adders 76–79.

The summed outputs correspond to the calculated and interpolated detector numbers for a pixel in four views as shown in FIG. 6. The detector numbers for alternate pixels are then clocked in registers 80–91 for subsequent pipeline operations. The interpolated detector numbers based on the detectors for alternate pixels in each view are obtained by adders 92–95. The calculated and interpolated detector numbers for consecutive pixels in each view are then applied through multiplexers 96–99 to registers 100–103 for use in addressing the double buffered memories of FIG. 5. The circuitry from the memories 42 through the adder 48 is conventional as used in the General Electric CT scanners.

The identification of detector numbers for use in determining pixel values for all the views in accordance with the invention, using a pipelined architecture and interpolated values, decreases image display time by reducing the number of calculations of detector numbers based on PERP and PARL values. The circuitry can be readily implemented using a semiconductor gate array. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. Circuitry for calculating pixel values from detector measurements in a CT scanner and the like in which a plurality of detectors measure attenuated radiation from a fan beam radiation source for consecutive projection views along a plane through an object located between said source and said plurality of detectors, said circuitry comprising means for identifying by calculation a detector for use in back projection through a first pixel in a first view, means for identifying by calculation a detector for use in back projection through said first pixel for a second view, means for identifying through interpolation a detector for use in back projection through said pixel for views intermediate said first and second views based on said calculated detector identifications for said first pixel, means for identifying a detector for use in back projection through a second pixel for said first view, means for identifying a detector for use in back projecting through said second pixel for said second view, means for identifying by interpolation a detector for use in back projecting said second pixel for views intermediate said first and second views based on said calculated detectors for said second pixel, and means for identifying by interpolation detectors for use in back projecting through pixels intermediate said first and second pixels for said first and second views and views therebetween based on said identified detectors for use in back projecting through said first and second pixels.

2. Circuitry as defined by claim 1 and further including means for obtaining a value of each pixel for each view including means for obtaining a detector value for each identified detector measurement for each pixel for each view, means for obtaining a pixel value for each pixel in each view based on detector values, and means for summing pixel values for each pixel form all views to obtain final pixel value.

3. Circuitry as defined by claim 2 and further including means for calculating a weighting factor for selected pixels and for interpolating weighting factors for other pixels based on the calculated weighting factors, and means for adjusting said average pixel values based on a weighting factor for said pixels.

4. Circuitry as defined by claim 1 and further including means for calculating a weighting factor for selected pixels and for interpolating weighting factors for other pixels based on said calculated weighting factors.

5. Circuitry as defined by claim 1 wherein said first and second views are separated by two views and said first and second pixels are separated by one pixel.

6. Circuitry as defined by claim 1 and further including at least one additional identical circuitry for calculating values of said pixels for additional views, and means for summing weighted values for a pixel from the first circuitry and the at least one additional circuitry.

7. A method of calculating pixel values from detector values in a CT scanner and the like in which a plurality of detectors measure attenuated radiation from a fan beam source for consecutive projection views along a plane through an object located between said source and said plurality of detectors, said method including the steps of identifying by calculation a detector for use in back projection through a first pixel in a first view, identifying by calculation a detector for use in back projection through said first pixel in a second view, identifying through interpolation a detector for use in back projection through said pixel for views intermediate said first and second views based on said calculated detectors for said first pixel, identifying a detector for use in back projection through a second pixel for said first view, identifying a detector for use in back projection through said second pixel for said second view, identifying by interpolation a detector for use in back projection through said second pixel for views intermediate said first and second views based on said calculated detectors for said second pixel, and identifying by interpolation detectors for use in back projection through pixels intermediate said first and second pixels for said first and second views and for views therebetween based on said indentified detectors for said first and second pixels.

8. The method as defined by claim 7 and further including the step of obtaining a value for each pixel in each view by obtaining a detector measurement value for each identified detector for each pixel in each view, obtaining a pixel value for each pixel in each view band on detector values and averaging pixel values for each pixel from all views to obtain an average pixel value.

9. The method as defined by claim 8 and further including weighting said average pixel value by a weighting factor.

10. The method as defined by claim 9 and further including the steps of calculating weighting factors for selected pixels and for interpolating weighting factors for other pixels based on the calculated weighting factors.

* * * * *

UNITED STATES PATENT AND TRADEMARK OFFICE
CERTIFICATE OF CORRECTION

PATENT NO. : 4,680,709
DATED : July 14, 1987
INVENTOR(S) : Nallaswamy Srinivasan et al.

It is certified that error appears in the above—identified patent and that said Letters Patent is hereby corrected as shown below:

Column 1, line 70, delete "obtaind" and insert --obtained--.

Column 2, line 41, delete "nd" and insert --and--.

Column 4, line 41, delete "ples" and insert --plies--.

Column 6, line 32, after "detector" insert --measurement--; line 34, delete "measurement".

Signed and Sealed this

Fifteenth Day of December, 1987

Attest:

DONALD J. QUIGG

Attesting Officer     Commissioner of Patents and Trademarks